US012289591B2

(12) United States Patent
Ren et al.

(10) Patent No.: US 12,289,591 B2
(45) Date of Patent: Apr. 29, 2025

(54) COAXIAL SPEAKER

(71) Applicant: AAC Microtech (Changzhou) Co., Ltd., Changzhou (CN)

(72) Inventors: Zhang Ren, Shenzhen (CN); Zhiwei Zhong, Shenzhen (CN); Wei Song, Shenzhen (CN)

(73) Assignee: AAC Microtech (Changzhou) Co., Ltd., Changzhou (CN)

(*) Notice: Subject to any disclaimer, the term of this patent is extended or adjusted under 35 U.S.C. 154(b) by 209 days.

(21) Appl. No.: 18/073,583

(22) Filed: Dec. 2, 2022

(65) Prior Publication Data

US 2024/0073614 A1 Feb. 29, 2024

Related U.S. Application Data

(63) Continuation of application No. PCT/CN2022/115650, filed on Aug. 30, 2022.

(51) Int. Cl.
*H04R 9/02* (2006.01)
*H04R 7/18* (2006.01)

(52) U.S. Cl.
CPC ............... *H04R 9/025* (2013.01); *H04R 7/18* (2013.01)

(58) Field of Classification Search
CPC ... H04R 1/24; H04R 1/26; H04R 7/18; H04R 9/025; H04R 9/063
USPC ................................ 381/182, 398, 401, 402
See application file for complete search history.

(56) References Cited

U.S. PATENT DOCUMENTS

2007/0098206 A1* 5/2007 Ando .................... H04R 1/023 381/386
2023/0292037 A1* 9/2023 Xu .......................... H04R 1/24

* cited by examiner

*Primary Examiner* — Katherine A Faley
(74) *Attorney, Agent, or Firm* — Wiersch Law Group

(57) ABSTRACT

The present invention provides a coaxial speaker including a supporting ring, a magnetic circuit system, a first vibration system, and a second vibration system. The second vibration system locates coaxially with the first vibration system. The first vibration system includes a first diaphragm and a first voice coil. The second vibration system includes a second diaphragm and a second voice coil. The first diaphragm is used for generating treble sound, the second diaphragm is used for generating bass sound. The supporting ring includes a first end portion, a second end portion, and a connecting portion. A projection of the first diaphragm is partially overlapped with a projection of the second diaphragm along a vibrating direction of the coaxial speaker. The treble diaphragm design uses a Z-axis direction vibration space of the bass diaphragm to increase the vibration area to improve the performance.

9 Claims, 4 Drawing Sheets

COAXIAL SPEAKER

FIELD OF THE PRESENT INVENTION

The present invention relates to the field of electro-acoustic devices, and more particularly, to a coaxial speaker.

DESCRIPTION OF RELATED ART

Coaxial speaker refers to the speaker with the integration of the treble unit and bass unit, and the treble unit and bass unit are set coaxially. The sound source of the treble unit and bass unit of the coaxial speaker can be located in front of the coaxial speaker, that is, the two speaker units sounding along a same direction. The sound source of the treble unit and bass unit of the coaxial speaker can also be located in front and back of the coaxial speaker respectively, that is, the two speaker units sounding along different directions.

In related art, the treble unit and bass unit of the coaxial speaker usually disposed on a same side of the coaxial speaker, the diaphragm of the treble unit and the diaphragm of bass unit are made of the same material, so the performance of the coaxial speaker is relatively simple and is difficult to control. Furthermore, the diaphragms of the treble unit and the bass unit has own independent vibration space. Under the control of limited size, the effective vibration area of the diaphragms will be limited, and the performance of the coaxial speaker will be poor.

Therefore, it is desired to provide a new coaxial speaker which can overcome the above problems.

SUMMARY

In view of the above, the embodiments of the present invention provide a new coaxial speaker. By the present invention, the diaphragm of the treble unit and the diaphragm of bass unit of the coaxial speaker can be flexibly adjusted.

The present invention provides a coaxial speaker including a supporting ring, a magnetic circuit system mounted under the supporting ring, a first vibration system fixed on an inner side of the supporting ring, and a second vibration system fixed on an outer side of the supporting ring and surrounding the first vibration system. The second vibration system locates coaxially with the first vibration system. The first vibration system includes a first diaphragm and a first voice coil driving the first diaphragm to generate sounds. The second vibration system includes a second diaphragm and a second voice coil driving the second diaphragm to generate sounds. The magnetic circuit system includes a first magnetic gap and a second magnetic gap located outside the first magnetic gap. The first voice coil at least partially locates into the first magnetic gap, the second voice coil at least partially locates into the second magnetic gap. The first diaphragm is used for generating treble sound, the second diaphragm is used for generating bass sound. The supporting ring includes a first end portion fixed to the first diaphragm, a second end portion fixed to the magnetic circuit system, and a connecting portion expanding outwardly from the second end portion and connecting to the first end portion. A projection of the first diaphragm is partially overlapped with a projection of the second diaphragm along a vibrating direction of the coaxial speaker.

As an improvement, the first diaphragm includes a first region, a first suspension surrounding the region, and a first fixing part mounted with the first end portion of the supporting ring, the second diaphragm including a second fixing part secured with the supporting ring or/and the magnetic circuit system and a second suspension bending and extending from the second fixing part, a projection of the first suspension partially overlapped with a projection of the second suspension along the vibrating direction of the coaxial speaker.

As an improvement, the second vibration system includes a voice coil support connecting the second diaphragm and the second voice coil, the second diaphragm further including a third suspension surrounding the second suspension and spaced apart from the second suspension, one side of the voice coil support connected to the second suspension, the other side of the voice coil support connected to the third suspension.

As an improvement, the second suspension and the third suspension are integrally hot-pressed molded by silicone rubber material and fixed with the voice coil support, and the second diaphragm is glued and fixed to the supporting ring or/and the magnetic circuit system.

As an improvement, the second suspension and the third suspension are glued and fixed to the voice coil support, and the second diaphragm is glued and fixed to the supporting ring or/and the magnetic circuit system.

As an improvement, the first diaphragm is glued and fixed to the supporting ring.

As an improvement, the magnetic circuit system includes a first magnet, a second magnet surrounding outside the first magnet, a third magnet disposed under the second magnet, a forth magnet surrounding outside the third magnet, and a magnetic guiding plate sandwiched between the second magnet and the third magnet, the first magnetic gap formed between the first magnet and the second magnet, the second magnet, the magnetic guiding plate and the third magnet disposed stacked and forming the second magnetic gap with the forth magnet.

As an improvement, the coaxial speaker further includes an inserting member supporting the first magnet and a first circuit board fixed between the inserting member and the magnetic circuit system, the first voice coil electrically connected to the first circuit board, the first circuit board including a positioning part fixed with the magnetic circuit system, a suspending arm extending from the positioning part, and a joint part formed on the suspending arm, the inserting member partially pressed on the positioning part.

As an improvement, the first vibration system includes a supporting frame connecting with the first voice coil and the first circuit board, the supporting frame including a supporting leg fixed to the joint part of the first circuit board, an avoiding portion disposed on the supporting frame, the first voice coil including a leading wire, the leading wire extending through the avoiding portion and mounted to a lower surface of the joint part of the first circuit board.

As an improvement, the inserting member includes an extending wall, and the positioning part of the first circuit board is fixed on the extending wall.

BRIEF DESCRIPTION OF THE DRAWINGS

Many aspects of the exemplary embodiments can be better understood with reference to the following drawing. The components in the drawing are not necessarily drawn to scale, the emphasis instead being placed upon clearly illustrating the principles of the present invention. Moreover, in the drawings, like reference numerals designate corresponding parts throughout the several views.

DETAILED DESCRIPTION OF THE EXEMPLARY EMBODIMENTS

The present invention will hereinafter be described in detail with reference to exemplary embodiments. To make the technical problems to be solved, technical solutions and beneficial effects of the present invention more apparent, the present invention is described in further detail together with the figures and the embodiments. It should be understood the specific embodiments described hereby is only to explain the disclosure, not intended to limit the disclosure.

Figure 1:
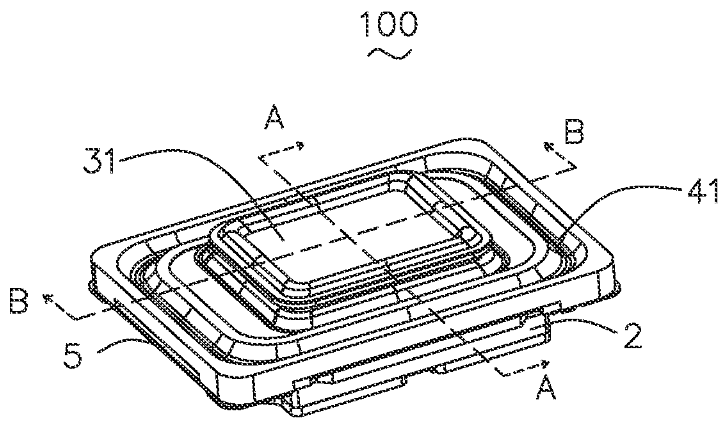
FIG. 1 is an illustrative isometric view of a coaxial speaker in accordance with one embodiment of the present invention.
Figure 2:
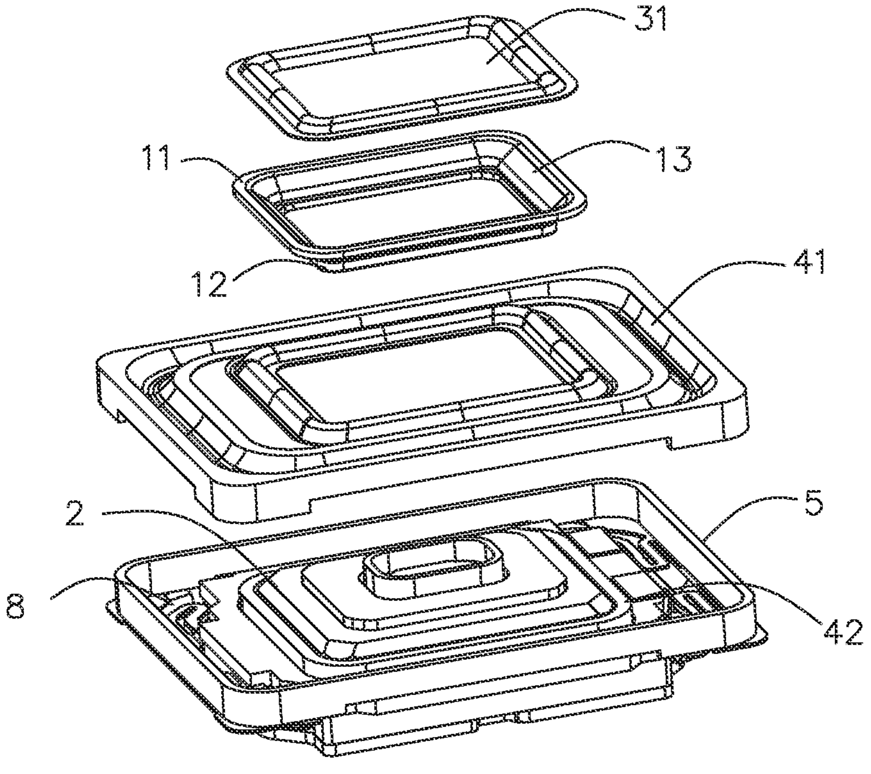
FIG. 2 is a partially exploded view of the coaxial speaker of FIG. 1.
Figure 3:
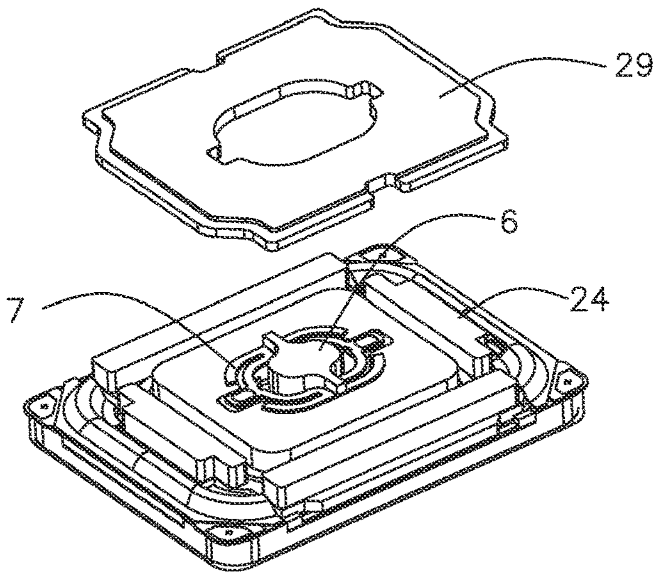
FIG. 3 is another partially exploded view of the coaxial speaker of FIG. 1.
Figure 4:
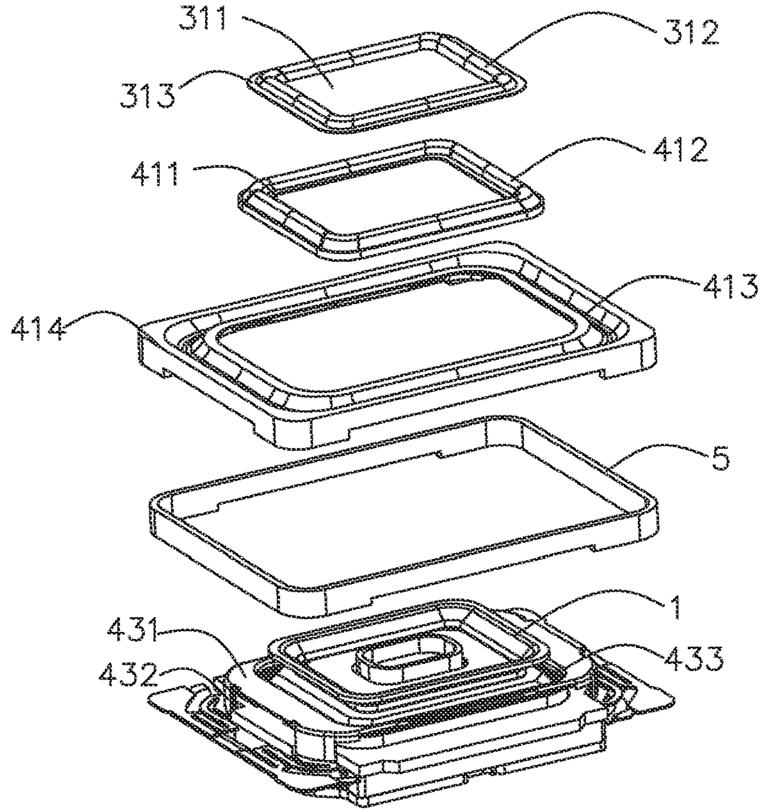
FIG. 4 is one more another partially exploded view of the coaxial speaker of FIG. 1.
Figure 5:
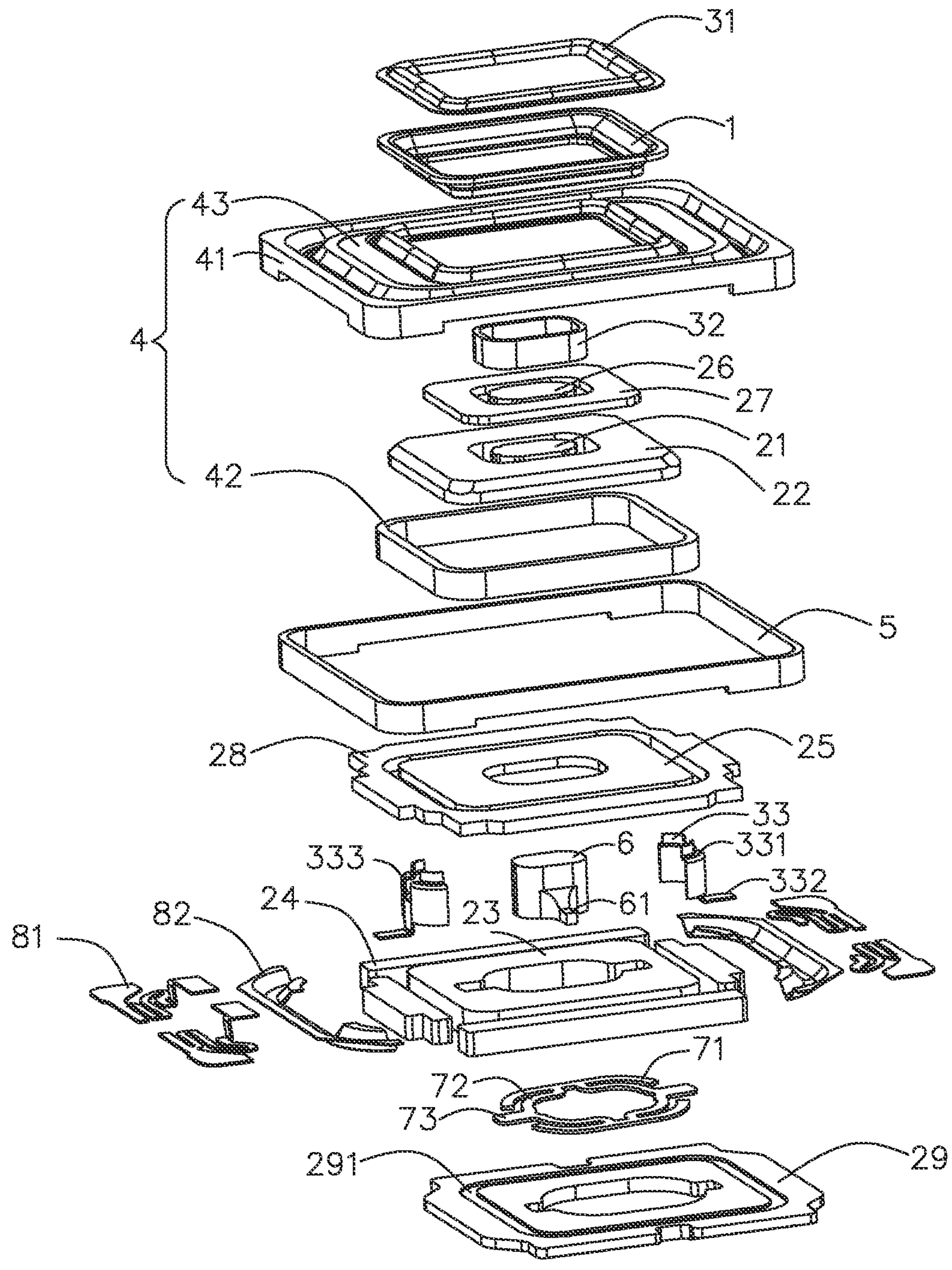
FIG. 5 is an exploded view of the coaxial speaker of FIG. 1.
Figure 6:
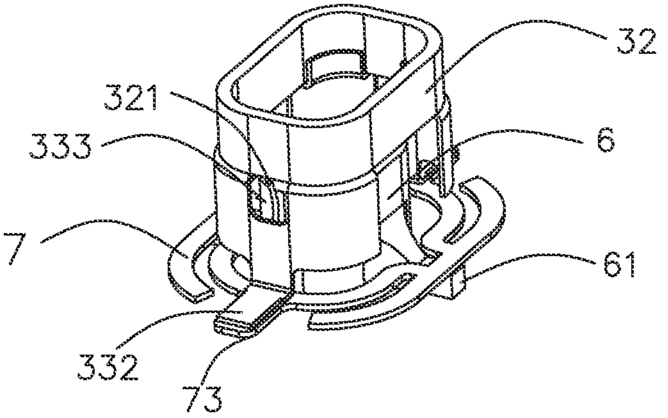
FIG. 6 is an illustrative isometric view of partly members of the coaxial speaker of FIG. 1.
Figure 7:
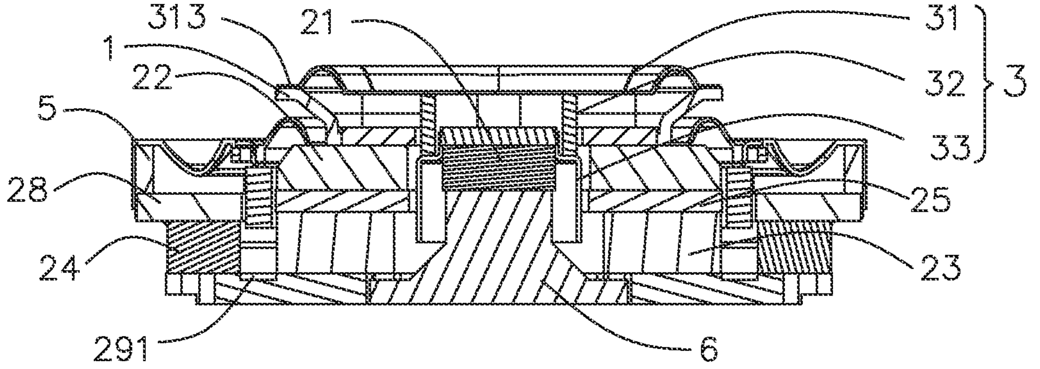
FIG. 7 is an illustrative cross-sectional view of the coaxial speaker taken along line A-A of FIG. 1.
Figure 8:
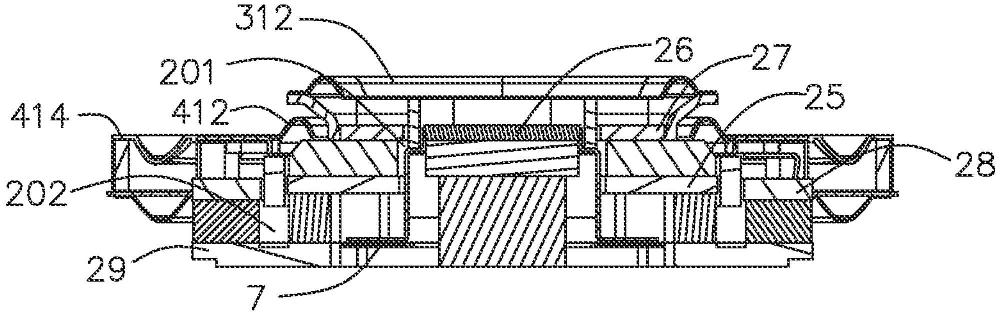
FIG. 8 is an illustrative cross-sectional view of the coaxial speaker taken along line B-B of FIG. 1.

Referring to the FIGS. 1-8, the embodiment of the present invention provides a coaxial speaker 100. The coaxial speaker 100 includes a supporting ring 1, a magnetic circuit system 2 mounted under the supporting ring 1, a first vibration system 3 fixed on an inner side of the supporting ring 1, a second vibration system 4 fixed on an outer side of the supporting ring 1, a frame 5 supporting the second vibration system 4, an inserting member 6 supporting part of the magnetic circuit 2, a first circuit board 7 fixed with the inserting member 6, an elastic assembly 8 mounted with the frame 5. The second vibration system 4 locates around the first vibration system 3 and is arranged coaxially with the first vibration system 3.

The supporting ring 1 is substantially rectangular, and the overall shape is horn. The supporting ring 1 includes a first end portion 11, a second end portion 12 fixed to the magnetic circuit system 2, and a connecting portion 13 expanding outwardly from the second end portion 12 and connecting to the first end portion 11. A size of the first end portion 11 is larger than the size of the second end portion 12.

The magnetic circuit system 2 includes a first magnet 21, a second magnet 22 surrounding outside the first magnet 21, a third magnet 23 disposed under the second magnet 22, a forth magnet 24 surrounding outside the third magnet 23, and a magnetic guiding plate 25 sandwiched between the second magnet 22 and the third magnet 23, a first pole plate 26 covered on the first magnet 21, a second pole plate 27 covered on the second magnet 22, a third pole plate 28 covered on the forth magnet 24, and a yoke 29 supporting the third magnet 23 and the forth magnet 24. A first magnetic gap 201 is formed between the first magnet 21, the first pole plate 26 and the second magnet 22, the second pole plate 27. The second magnet 22, the magnetic guiding plate 25 and the third magnet 23 are disposed stacked and form a second magnetic gap 202 with the forth magnet 24, the third pole plate 28. The second magnetic gap 202 locates outside the first magnetic gap 201.

The first magnet 21, the second magnet 22, the third magnet 23, and the forth magnet 24 are magnetized along a vibration direction of the coaxial speaker 100, and the first magnet 21 and second magnet 22 are set opposite to each other with a same pole, that is, the first magnet 21 and the second magnet 22 are magnetized in opposite directions. The second magnet 22 and the third magnet 23 are magnetized in opposite directions. The third magnet 23 and the forth magnet 24 are magnetized in opposite directions. In present embodiment, the second magnet 22, the third magnet 23, the forth magnet 24, the magnetic guiding plate 25, the second pole plat 27, the third pole plate 28, and the yoke 29 can all be hollow annular structures. Furthermore, the forth magnet 24 can also be a split type magnet.

The first vibration system 3 includes a first diaphragm 31, a first voice coil 32 driving the first diaphragm 31 to generate sounds, and a supporting frame 33 supporting the first voice coil 32. The first voice coil 32 at least partially locates into the first magnetic gap 201. The first diaphragm 31 is integrally molded. Optionally, the first diaphragm 31 also can be made by a conventional lamination method. The first diaphragm 31 is used for generating treble sound, and a sound direction of the first diaphragm 31 is upward along the vibration direction, that is, the sound direction of the first diaphragm 31 is in front of the coaxial speaker 100. The first diaphragm 31 includes a first region 311, a first suspension 312 surrounding the first region 311, and a first fixing part 313 mounted with the first end portion 11 of the supporting ring 1. The first fixing part 313 is fixedly attached to an upper surface of the first end portion 11. The first region 311, the first suspension 312, and the first fixing part 313 can be integrally molded by silica gel, rubber, polyether ether ketone (PEEK), polyethylene naphthalene glycol (PEN), polyethylene terephthalate (PET) or other materials. The first diaphragm 31 is glued and fixed to the first end portion 11 of the supporting ring 1.

The first voice coil 32 includes a leading wire 321.

The supporting frame 33 includes a supporting portion 331 supporting the first voice coil 32 and a supporting leg 332 located on a lower end of the supporting frame 33. An avoiding portion 333 is disposed on the supporting frame 33.

The second vibration system 4 includes a second diaphragm 41, a second voice coil 42 driving the second diaphragm 41 to generate sounds, and a voice coil support 43 connecting the second diaphragm 41 to the second voice coil 42. The second diaphragm 41 locates under the first diaphragm 31, that is, compared with the first diaphragm 31, the second diaphragm 41 is closer to the yoke 29. The second voice coil 42 at least partially locates into the second magnetic gap 202. The second diaphragm 41 is used for generating bass sound, and the sound direction of the second diaphragm 41 is upward along the vibration direction, that is, the sound direction of the second diaphragm 41 is in front of the coaxial speaker 100.

The second diaphragm 41 includes a second fixing part 411 secured with the supporting ring 1 or/and the magnetic circuit system 2, a second suspension 412 bending and extending from the second fixing part 411, a third suspension 413 surrounding the second suspension 412 and spaced apart from the second suspension 412, and a third fixing part 414 extending from a side of the third suspension 413 distal to the second suspension 412. One side of the voice coil support 43 is connected to the second suspension 412, the other side of the voice coil support 43 is connected to the third suspension 413. The second fixing part 411 is attached fixed to an upper surface of the second magnet 22, and/or the second fixing part 411 is attached fixed to an outer surface of the second end portion 12 of the supporting ring 1.

The second fixing part 411, the second suspension 412, the third suspension 413, and the third fixing part 414 are integrally hot-pressed molded by silicone rubber material and fixed with the voice coil support 43, and then, the whole second diaphragm 41 is glued and fixed to the supporting ring 1 or/and the second magnet 22. Alternatively, the second fixing part 411, the second suspension 412, the third suspension 413, and the third fixing part 414 are glued and fixed to the voice coil support 43, and then, the whole second diaphragm 41 is glued and fixed to the supporting ring 1 or/and the second magnet 22.

A projection of the first diaphragm 31 is partially overlapped with a projection of the second diaphragm 41 along the vibrating direction of the coaxial speaker 100. In detail, a projection of the first suspension 312 is partially overlapped with a projection of the second suspension 412 along the vibrating direction of the coaxial speaker 100. In this way, the first diaphragm 31 occupies part of a space of the second diaphragm 41 in a Z-axis direction, that is, the first diaphragm 31 occupies part of the space of the second diaphragm 41 in the vertical vibration direction of coaxial speaker 100. Thus, the vibration space of the first diaphragm 31 and the second diaphragm 41 can be increased under the limited size requirements, which can improve the acoustic performance of the coaxial speaker 100.

A recessing portion 291 is provided on the yoke 29 corresponding to a position of the second voice coil 42 to provide enough vibration space for the second voice coil 42.

The frame 5 is a hollow annular structure. The third fixing part 414 of the second diaphragm 41 is attached fixed to an upper surface of the frame 5, and further bends and extends to cover part of an outer surface of the frame 5.

The inserting member 6 supports the first magnet 21 and the first pole plate 26. The inserting member 6 includes an extending wall 61 arranged symmetrically on both sides thereof.

The first circuit board 7 is fixed between the inserting member 6 and the magnetic circuit system 2. The first voice coil 32 is electrically connected to the first circuit board 7. The first circuit board 7 includes a positioning part 71 fixed with the third magnet 23 of the magnetic circuit system 2, a suspending arm 72 extending from the positioning part 71, and a joint part 73 formed on the suspending arm 72. The extending wall 61 of the inserting member 6 is pressed on a middle portion of the positioning part 71. The positioning part 71 is attached and fixed to a lower surface of the third magnet 23. The positioning part 71 is disposed two, and is relatively arranged along a long axis direction. Each positioning part 71 is provided with two suspending arms 72, the opposite suspending arms 72 of the two positioning parts 71 are extended to each other and then connected with the joint part 73. The supporting leg 332 of the supporting frame 33 is supported on an upper surface of the joint part 73 of the first circuit board 7. The leading wire 321 of the first voice coil 32 extends through the avoiding portion 333 and is mounted to a lower surface of the joint part 73.

The elastic assembly 8 connects the voice coil support 43 and the frame 5. The elastic assembly 8 includes a second circuit board 81 and a support membrane 82 connected with the second circuit board 81. The second voice coil 42 is electrically connected to the second circuit board 81. In this embodiment, the number of the elastic assemblies 8 is two, and each elastic assembly 8 is arranged in a direction of a short axis of the coaxial speaker 100. In other embodiments, the position of the elastic assembly 8 may be determined according to the situation.

The voice coil support 43 includes a flat portion 431, a first extending portion 432 bending and extending from the flat portion 431 to the second circuit board 81 and connected to the second circuit board 81, and a second extending portion 433 bending and extending from the flat portion 431 to the second voice coil 42 and connected to the second voice coil 42. A side of the flat portion 431 is connected to the second suspension 412, and other side of the flat portion 431 is connected to the third suspension 413.

Comparing with the related art, in the coaxial speaker of present invention, the coaxial speaker including a supporting ring, a magnetic circuit system mounted under the supporting ring, a first vibration system fixed on an inner side of the supporting ring, and a second vibration system fixed on an outer side of the supporting ring and surrounding the first vibration system. The second vibration system locates coaxially with the first vibration system. The first vibration system includes a first diaphragm and a first voice coil driving the first diaphragm to generate sounds. The second vibration system includes a second diaphragm and a second voice coil driving the second diaphragm to generate sounds. The magnetic circuit system includes a first magnetic gap and a second magnetic gap located outside the first magnetic gap. The first voice coil at least partially locates into the first magnetic gap, the second voice coil at least partially locates into the second magnetic gap. The first diaphragm is used for generating treble sound, the second diaphragm is used for generating bass sound. The supporting ring includes a first end portion fixed to the first diaphragm, a second end portion fixed to the magnetic circuit system, and a connecting portion expanding outwardly from the second end portion and connecting to the first end portion. A projection of the first diaphragm is partially overlapped with a projection of the second diaphragm along a vibrating direction of the coaxial speaker.

The coaxial speaker of the present invention arranges an annular bass vibration system for providing bass sound, a treble vibration system disposed surrounded by the bass vibration system for providing treble sound. Bass sound and treble sound form a full-range speaker, providing high-quality sound. The material and thickness of the treble and bass diaphragm can be adjusted separately according to the different characteristics of bass sound and treble sound, which makes the production of the treble and bass diaphragms more flexible. Moreover, part of the projections of the bass diaphragm and the treble diaphragm in the vibration direction of the coaxial speaker overlap with each other, the treble diaphragm design utilizes the Z-axis direction vibration space of the bass diaphragm, which can increase the vibration space of the diaphragms and improve the acoustic performance of the coaxial speaker compared with the conventional design.

It is to be understood, however, that even though numerous characteristics and advantages of the present exemplary embodiments have been set forth in the foregoing description, together with details of the structures and functions of the embodiment, the disclosure is illustrative only, and changes may be made in detail, especially in matters of shape, size, and arrangement of parts within the principles of the invention to the full extent indicated by the broad general meaning of the terms where the appended claims are expressed.

What is claimed is:

1. A coaxial speaker, comprising:

a supporting ring;

a magnetic circuit system mounted under the supporting ring, the magnetic circuit system comprising a first magnetic gap and a second magnetic gap located outside the first magnetic gap;

a first vibration system fixed on an inner side of the supporting ring, the first vibration system comprising a first diaphragm and a first voice coil driving the first diaphragm to generate sounds, the first voice coil at least partially located into the first magnetic gap, the first diaphragm used for generating treble sound; and a second vibration system fixed on an outer side of the supporting ring and surrounding the first vibration system, the second vibration system located coaxially with the first vibration system, the second vibration system comprising a second diaphragm and a second voice coil driving the second diaphragm to generate sounds, the second voice coil at least partially located into the second magnetic gap, the second diaphragm used for generating bass sound;

wherein the supporting ring comprises a first end portion fixed to the first diaphragm, a second end portion fixed to the magnetic circuit system, and a connecting portion expanding outwardly from the second end portion and connecting to the first end portion, a projection of the first diaphragm is partially overlapped with a projection of the second diaphragm along a vibrating direction of the coaxial speaker;

wherein the first diaphragm comprises a first region, a first suspension surrounding the first region, and a first fixing part mounted with the first end portion of the supporting ring, the second diaphragm comprising a second fixing part secured with the supporting ring or/and the magnetic circuit system and a second suspension bending and extending from the second fixing part, a projection of the first suspension partially overlapped with a projection of the second suspension along the vibrating direction of the coaxial speaker.

2. The coaxial speaker as described in claim 1, wherein the second vibration system comprises a voice coil support connecting the second diaphragm and the second voice coil, the second diaphragm further comprising a third suspension surrounding the second suspension and spaced apart from the second suspension, one side of the voice coil support connected to the second suspension, another side of the voice coil support connected to the third suspension.

3. The coaxial speaker as described in claim 2, wherein the second suspension and the third suspension are integrally hot-pressed molded by silicone rubber material and fixed with the voice coil support, and the second diaphragm is glued and fixed to the supporting ring or/and the magnetic circuit system.

4. The coaxial speaker as described in claim 2, wherein the second suspension and the third suspension are glued and fixed to the voice coil support, and the second diaphragm is glued and fixed to the supporting ring or/and the magnetic circuit system.

5. The coaxial speaker as described in claim 1, wherein the first diaphragm is glued and fixed to the supporting ring.

6. The coaxial speaker as described in claim 1, wherein the magnetic circuit system comprises a first magnet, a second magnet surrounding outside the first magnet, a third magnet disposed under the second magnet, a forth magnet surrounding outside the third magnet, and a magnetic guiding plate sandwiched between the second magnet and the third magnet; the first magnetic gap formed between the first magnet and the second magnet; the second magnet, the magnetic guiding plate and the third magnet disposed stacked and forming the second magnetic gap with the forth magnet.

7. The coaxial speaker as described in claim 6, wherein the coaxial speaker further comprises an inserting member supporting the first magnet and a first circuit board fixed between the inserting member and the magnetic circuit system, the first voice coil electrically connected to the first circuit board, the first circuit board comprising a positioning part fixed with the magnetic circuit system, a suspending arm extending from the positioning part, and a joint part formed on the suspending arm, the inserting member partially pressed on the positioning part.

8. The coaxial speaker as described in claim 7, wherein the first vibration system comprises a supporting frame connecting with the first voice coil and the first circuit board, the supporting frame comprising a supporting leg fixed to the joint part of the first circuit board, an avoiding portion disposed on the supporting frame, the first voice coil comprising a leading wire, the leading wire extending through the avoiding portion and mounted to a lower surface of the joint part of the first circuit board.

9. The coaxial speaker as described in claim 7, wherein the inserting member comprises an extending wall, and the positioning part of the first circuit board is fixed on the extending wall.

* * * * *